(12) United States Patent
Zhao

(10) Patent No.: US 7,013,398 B2
(45) Date of Patent: Mar. 14, 2006

(54) DATA PROCESSOR ARCHITECTURE EMPLOYING SEGREGATED DATA, PROGRAM AND CONTROL BUSES

(75) Inventor: Sheng Zhao, Coquitlam (CA)

(73) Assignee: Nokia Corporation, Espoo (FI)

( * ) Notice: Subject to any disclaimer, the term of this patent is extended or adjusted under 35 U.S.C. 154(b) by 600 days.

(21) Appl. No.: 10/004,403

(22) Filed: Nov. 15, 2001

(65) Prior Publication Data

US 2003/0105906 A1    Jun. 5, 2003

(51) Int. Cl.
*G06F 12/00* (2006.01)
(52) U.S. Cl. .................. 713/310; 713/320; 710/29; 710/72; 710/305; 712/35
(58) Field of Classification Search ............. 713/310, 713/320, 310.32; 710/305, 29, 72; 712/35
See application file for complete search history.

(56) References Cited

U.S. PATENT DOCUMENTS

| 4,228,498 A | * | 10/1980 | Moshier ...................... 710/301 |
| 5,890,005 A | * | 3/1999 | Lindholm .................... 713/320 |
| 5,930,523 A | * | 7/1999 | Kawasaki et al. ............ 712/32 |
| 6,327,648 B1 | * | 12/2001 | Hedayat et al. ............... 712/35 |

* cited by examiner

*Primary Examiner*—A. Elamin
(74) *Attorney, Agent, or Firm*—Harrington & Smith, LLP

(57) ABSTRACT

A mobile station includes an RF transceiver and a user interface. The mobile station further includes a plurality of data processor cores each having a first interface supporting a first bus coupled to an associated one of a plurality of program memories, a second interface supporting a second bus coupled to a common data memory, and a third interface supporting a third bus coupled to at least one input/output device. Each of the first, second and third buses include an address bus that is sourced from the processor core and a data bus. The plurality of data processor cores may be contained within a single integrated circuit package, such as an ASIC, in a System on Chip (SoC) configuration. In this case a first processor core may function as a CPU for controlling the overall operation of the mobile station, including the user interface, while a second processor core functions as a DSP for controlling operation of the RF transceiver. The first interface supports a unidirectional data bus from the program memory, and the second interface and the third interface each support a bidirectional data bus. Each of the plurality of processor cores has the second interface coupled to the common data memory through a common memory control unit, and the third interface is coupled to at least one of a plurality of interface devices through a common control bus unit. Each of the processor cores operates with a clock signal and fetches an instruction from the associated one of the plurality of program memories using the address bus and the data bus of the first interface, the instruction fetch being referenced to a predetermined edge of the clock signal. Each processor core then begins an execution of the fetched instruction on a next occurrence of said predetermined edge of said clock signal. The first interface is responsive to an assertion of a HOLD signal for suspending the fetching of a next instruction from the program memory. The segregation of the program, data and control buses provides for increased efficiencies and bus bandwidth, increasing the number of instructions that are executed per unit of time at a given clock frequency.

15 Claims, 10 Drawing Sheets

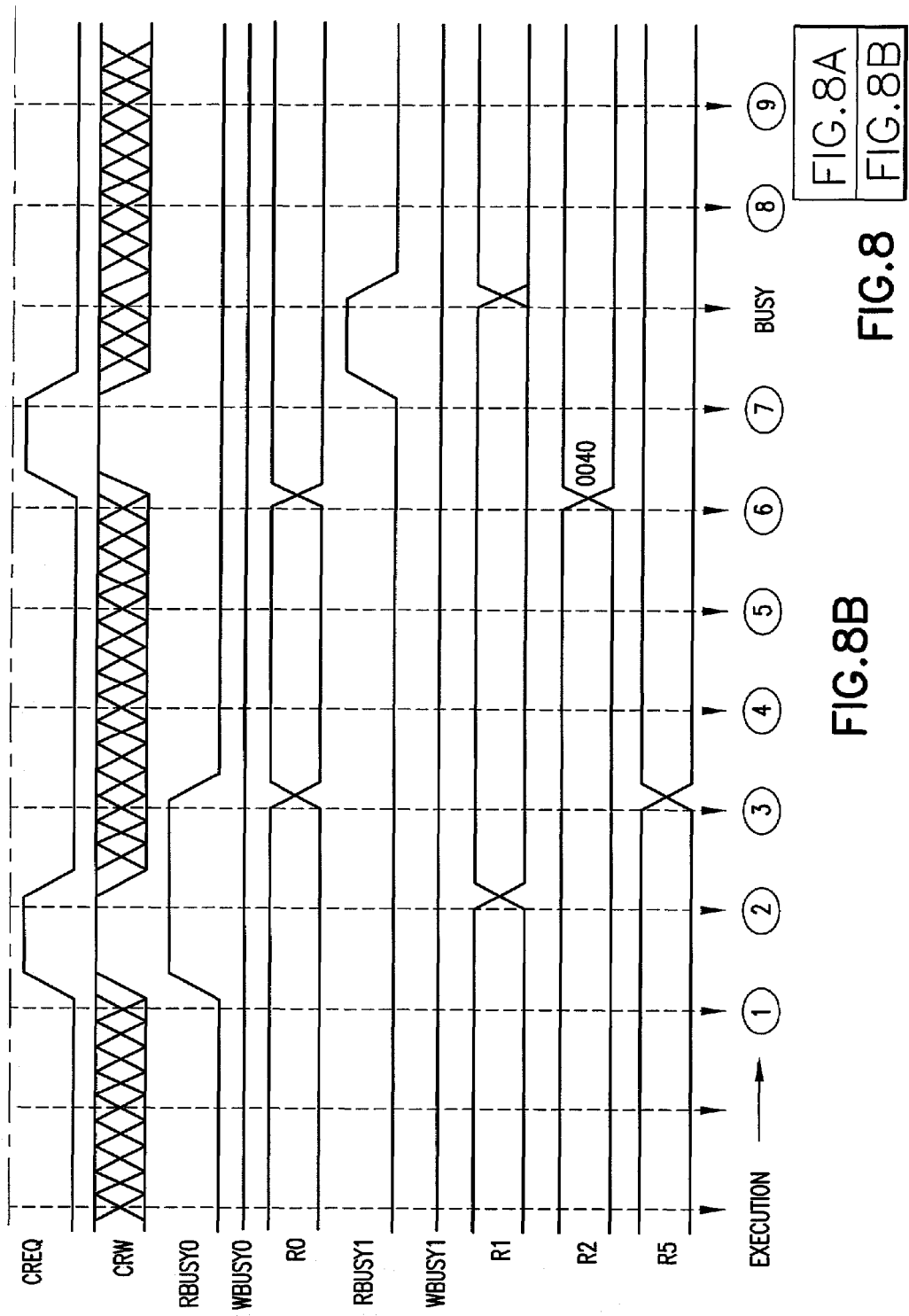

DATA PROCESSOR ARCHITECTURE EMPLOYING SEGREGATED DATA, PROGRAM AND CONTROL BUSES

TECHNICAL FIELD

These teachings relate generally to data processors and data processing system architectures and, more specifically, these teachings relate to the integration of computer systems into integrated circuits, such as application specific integrated circuits (ASICs), and to the buses that connect to the data processor(s).

BACKGROUND

For System on Chip(SoC) ASIC and other types of designs the Central Processing Unit (CPU), Digital Signal Processor (DSP), memory and other related circuits are integrated within a single ASIC package. The trend is towards providing more data streams, requiring more data processing to occur. The design of the CPU and the DSP typically places the control stream (program data) and the data stream on the same bus, where these various types of data share bus cycles. The data stream can include, for example, operands and the results of computations, as well as data transferred between interfaces and memory under the control of a direct memory access (DMA) controller. However, more data streams require more bus cycles, which in turn reduces the control stream bus cycles, and thus reduces the number of instructions executed per second by the CPU and the DSP (typically measured in millions of instructions per second, or MIPS). The reduction in the number of MIPs is very undesirable, as modern data processing systems are typically expected to execute more instructions per second. This can be especially true in the SoC type systems, where the SoC system may operate within a wireless communicator such as cellular telephone, and be required to execute in real time or near real time a number of complex speech and/or packet data and/or signaling operations and algorithms, including encryption and decryption operations and algorithms.

While it may appear that simply increasing the clock frequency would enable one to increase the number of MIPs, in reality an increase in the clock frequency requires an increase in operating current. In battery powered and portable device applications any increase in current consumption is generally seen as a disadvantage, as the time between required rechargings of the battery is reduced.

A need thus exists to increase the number of MIPs in a data processing system, in particular in a SoC type system, without also significantly increasing the current consumption.

SUMMARY OF THE PREFERRED EMBODIMENTS

The foregoing and other problems are overcome, and other advantages are realized, in accordance with the presently preferred embodiments of these teachings.

A mobile station includes an RF transceiver and a user interface. The mobile station further includes a plurality of data processor cores each having a first interface supporting a first bus coupled to an associated one of a plurality of program memories, a second interface supporting a second bus coupled to a common data memory, and a third interface supporting a third bus coupled to at least one input/output device. Each of the first, second and third buses include an address bus that is sourced from the processor core and a data bus. The plurality of data processor cores may be contained within a single integrated circuit package, such as an ASIC. In this case a first processor core may functions as a CPU for controlling the overall operation of the mobile station, including the user interface, while a second processor core functions as a DSP for controlling operation of the RF transceiver.

The interface supports a unidirectional data bus from the program memory, and the second interface and the third interface each support a bidirectional data bus. Each of the plurality of processor cores has the second interface coupled to the common data memory through a common memory control unit, and the third interface is coupled to at least one of a plurality of interface devices through a common control bus unit.

Each of the processor cores operates with a clock signal and fetches an instruction from the associated one of the plurality of program memories using the address bus and the data bus of the first interface, the instruction fetch being referenced to a predetermined edge of the clock signal. Each processor core then begins an execution of the fetched instruction on a next occurrence of the predetermined edge of the clock signal. The first interface is responsive to an assertion of a HOLD signal for suspending the fetching of a next instruction from the program memory and the execution of a current fetched instruction.

Also disclosed is a method for operating a data processor. The method includes providing a clock signal and, in synchronism with a predetermined edge of the clock signal, fetching a program instruction from a program memory over a program bus, decoding a fetched instruction, beginning execution of the decoded instruction during a next occurrence of the predetermined edge of the clock signal and, depending on the decoded instruction, reading data from or writing data to a data memory over a data bus, or reading data from or writing data to an interface device over a control bus, or reading data from and/or writing data to both the data bus and the control bus at the same time. Each of the program, data and control buses include the address bus that is sourced from the data processor and a data bus. Responsive to an assertion of the HOLD signal, the method suspends the fetching of a next instruction from said program memory as well as the execution of a current fetched instruction.

The segregation of the program, data and control buses provides for increased efficiencies and bus bandwidth, and serves to increase the number of instructions that are executed per unit of time at a given clock frequency.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIGS. 8A and 8B, collectively referred to as FIG. 8, are a waveform timing diagram showing data transfers between Registers, CBUS and DBUS for an exemplary program.

DETAILED DESCRIPTION OF THE PREFERRED EMBODIMENTS

Figure 1:
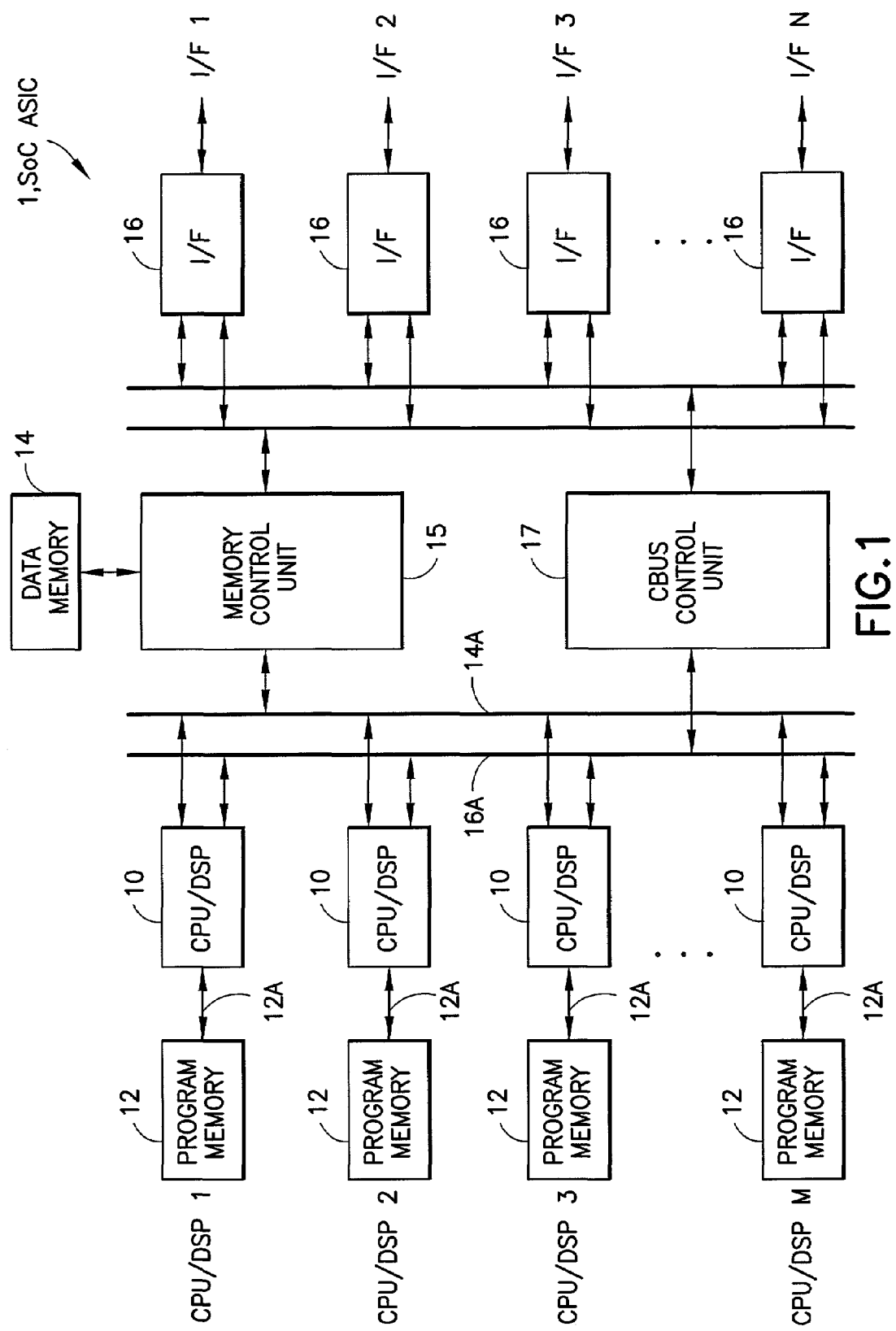
FIG. 1 is a block diagram of an exemplary multi-processor embodiment of this invention, wherein the multi-bus structure is made evident by the separate program data memory for each CPU/DSP that is connected through a program bus (PBUS) and a common data memory for all of the CPU/DSPs and interfaces (I/Fs) that are connected through a data bus (DBUS)

FIG. 1 is a block diagram of an exemplary multi-processor embodiment of this invention, wherein the multi-bus structure in accordance with an aspect of this invention employs a separate program data memory 12 for each CPU/DSP 10 that is connected through a program bus (PBUS) 12A. FIG. 1 also shows a common data memory 14 for all of the CPU/DSPs 10 that is connected through a data bus (DBUS) 14A, via a Memory Control Unit 15. A plurality (N) of interface (I/F) circuit blocks 16 are connected to the plurality (M) of CPU/DSPs 10 via a Control Bus (CBUS) 16A and a CBUS Control Unit 17, and/or through DBUS 14A via Memory Control Unit 15.

All of the components shown in FIG. 1 may be found in one integrated circuit (IC) device, such as a single SoC ASIC 1. Alternatively, the components may be distributed between multiple ICs. Also, the data memory 14 may be an external component or memory subsystem, and/or the program memories 12 could be external to the IC, and/or one or both or all of the Memory Control Unit 15, the CBUS Control Unit 17 and I/Fs 16 could be external to the IC.

While a plurality of CPU/DSPs 10 are shown, in other embodiments only one or two may be employed. Further, it should be realized that by CPU/DSP what is meant is either a CPU or a DSP. For example, there maybe two DSPs and two CPUs in a given system, or eight CPUs and one DSP, or six DSPs and three CPUs, etc. The base functionality of each is referred to herein as a CPU core or a DSP core, or more generically simply as a core.

The CPU (DSP) bus is segregated into three separate and independent buses. These are the above-mentioned Program Bus (PBUS) 12A, the Data Bus (DBUS) 14A and the Control Bus (CBUS) 16A. Each of these buses has its own address bus, data path(s) and control signals. The program memory 12 is connected to PBUS 12A, and all core instructions are fetched through the PBUS associated with that particular core. The memory 14 used to store data resides on DBUS 14A, and all high speed data transfer between the interfaces 16 and the data memory 14, or data accessed by the CPU (DSP) 10 through DBUS 14A takes place on DBUS 14A. The lower speed data stream, such as control and status register read/write, resides on the CBUS 16A.

As was mentioned, each CPU (DSP) 10 has its own local program memory 12 connected to the PBUS 12A, and each is connected to the others through DBUS 14A and/or CBUS 16A. In a typical case the CPU (DSP) 10 requires more than one clock cycle to execute a memory read/write instruction. However, by separating PBUS 12A and DBUS 14A it becomes possible to make every instruction execution require only one clock cycle. In this manner the processing speed is not compromised by data transfers that must share a single bus with program (instruction) data.

The Memory Control Unit 15 may be a conventional Direct Memory Access (DMA) type of controller. The CBUS Control Unit 17 may be implemented using a block of control and status registers. The specifics of the construction of these external logic blocks is not germane to an understanding of the teachings of this invention.

Figure 2:
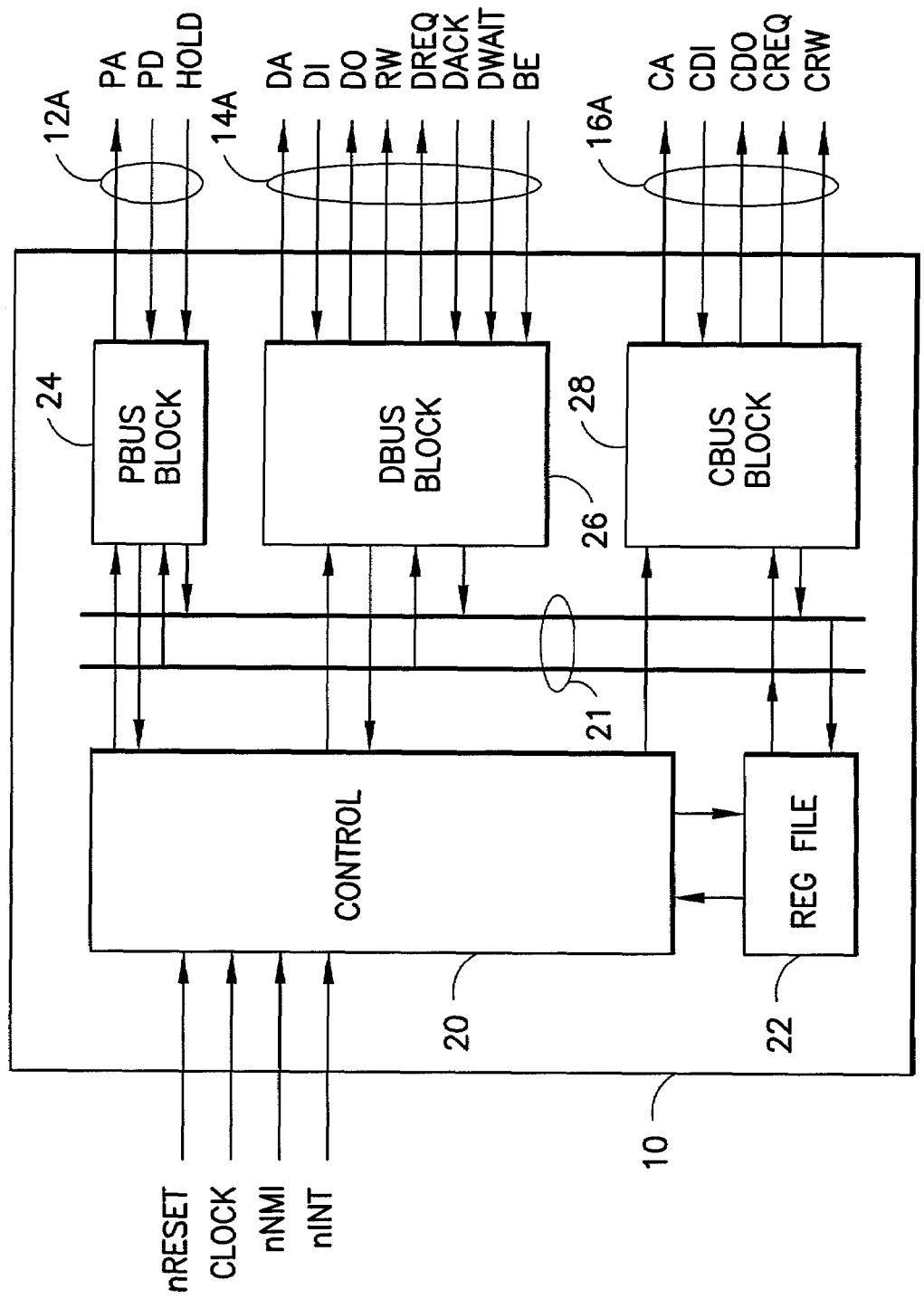
FIG. 2 is a block diagram of one of the CPU/DSP blocks of FIG. 1.

FIG. 2 illustrates the presently preferred embodiment of the CPU 10 that is compatible with the multi-bus architecture shown in FIG. 1. Although described in the context of a CPU, it should be appreciated that this description would apply as well to a DSP embodiment. The CPU 10 includes a control logic block 20 that implements the core CPU functionality, a Register File 22 (see FIG. 7), a PBUS interface block 24 (see FIG. 3), a DBUS interface block 26 (see FIG. 5) and a CBUS interface block 28 (see FIG. 6). In an exemplary but not limiting embodiment, the Program Data (PD) portion of PBUS 12A is 32 bits in width and conveys only program (instruction) data from the program memory 12 to the CPU 10; the data path portion of DBUS 14A is 32 bits in width and provides 8-bit, 16-bit and 32-bit data memory 14 access capability; and, CBUS 16A is also 32 bits wide for enabling control and status register access.

The CPU 10 fetches stored program instructions only through the PBUS 12A. For data transfers between registers and memory, memory and memory, and memory and CBUS 16A, the CPU control block 20 sends related commands to the DBUS block 26 and/or the CBUS block 28, via internal control paths 21, and continues to execute the next instruction without waiting for the resource for the next instruction. Note, in this regard, FIG. 8, where the LDD R0, dadr1 instruction requires three clock cycles, but does not affect program execution. In this manner all instructions may execute in one clock cycle.

Figure 3:
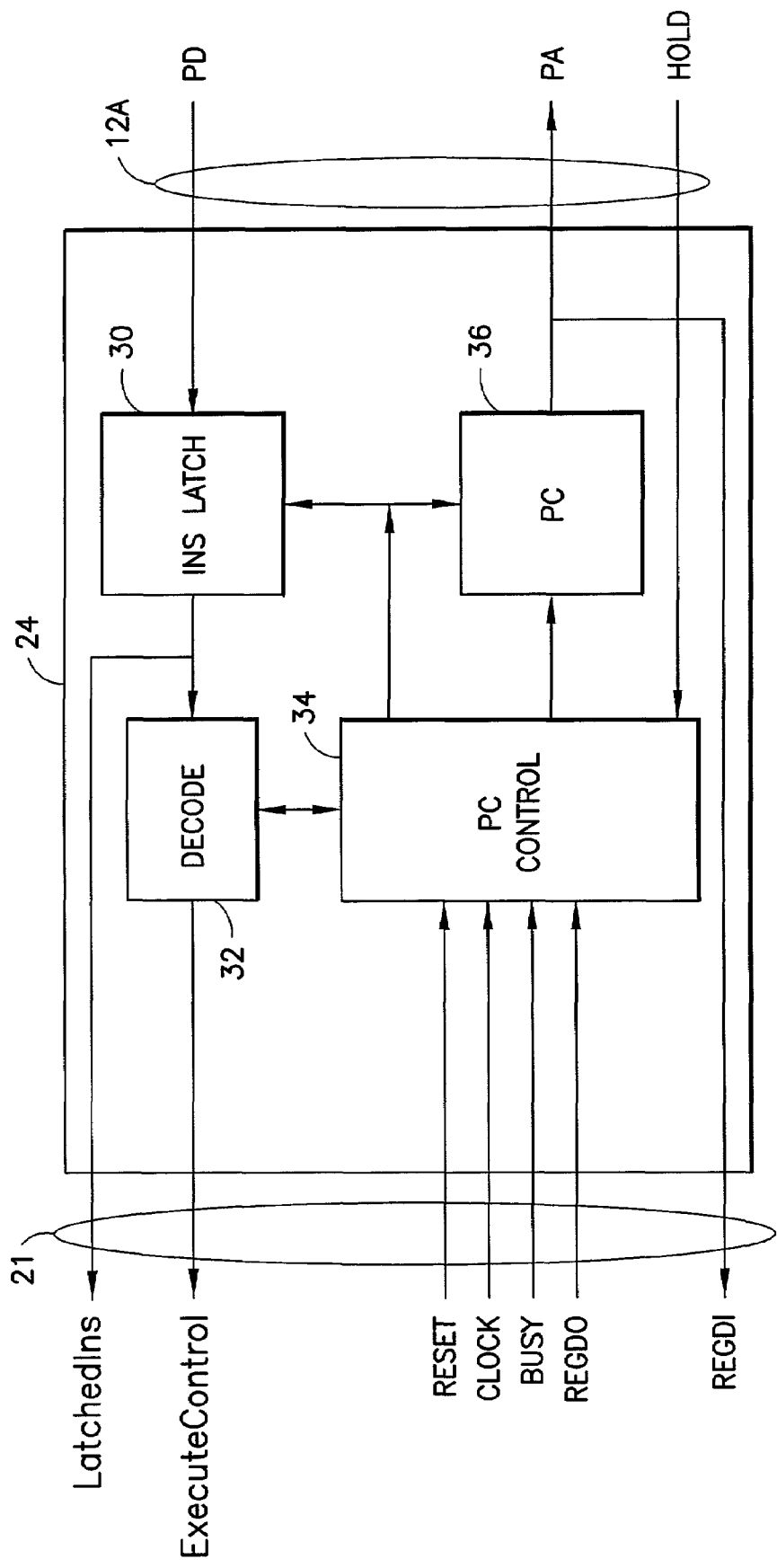
FIG. 3 is a block diagram of the PBUS block shown in FIG. 2.

FIG. 3 shows the PBUS block 24. The PBUS block 24 sources the program address (PA) bus and sinks the program data (PD) bus, as well as a HOLD signal. There is no memory select and read control signal. Instead, program data is sampled on the clock rising edge, and the resulting instruction executed on next clock rising edge if the resource for the instruction ready (see FIG. 8). The HOLD signal can be used to stop the CPU execution in the event a required resource is not ready, and can also be used for debugging and other purposes.

Figure 4:
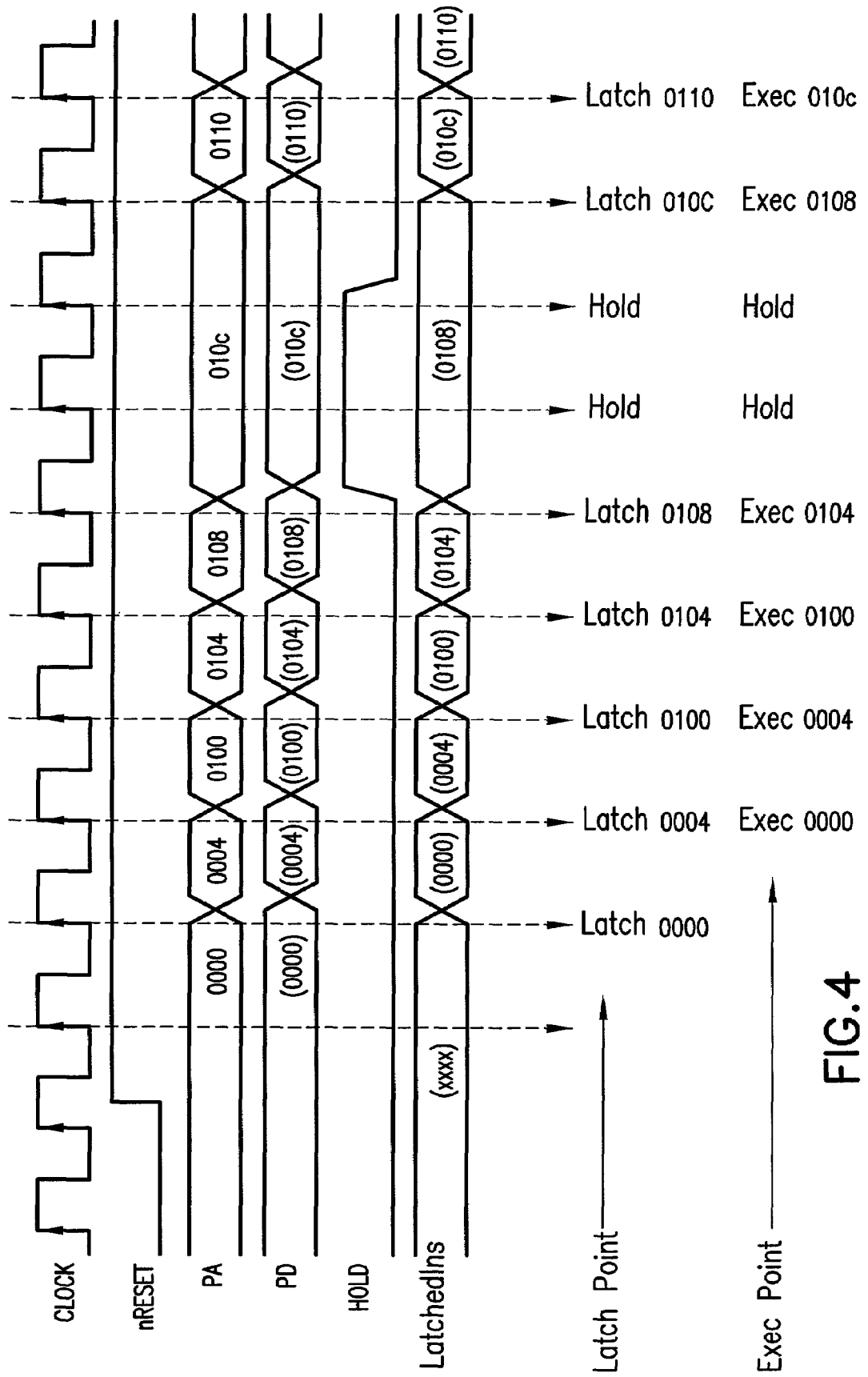
FIG. 4 is a waveform timing diagram showing the operation of a Reset sequence and the operation of a HOLD signal line in relation to the PBUS block of FIG. 3.

PD is a 32-bit bus. The instruction set of CPU 10 maybe in a 32-bit or a 32/16-bit format. In the preferred embodiment the first 32 bytes of program space in the program memory 12 are reserved for RESET (0x0), Non-maskable interrupt nNMI(0x8), maskable interrupt nINT(0x10) and software interrupt SWI(0x18) vector storage purposes. A branch instruction maybe used to jump to a related portion of the program. FIG. 4 shows the operation of the reset sequence and how the HOLD signal operates. Note in FIG. 4 that the program address (PA) bus increments by four, due to the use of a 4×8 or 32-bit wide program format. LatchedIns means Latched Instruction out of the instruction latch 30 of FIG. 3. The latched instruction is decoded by decoder block 32, and provided to the CPU control block 20. The PBUS block 24 also includes a program counter (PC) control block 34 that drives the program counter (PC) 36. The output of the PC 36 is the PA that is applied to the program memory 12. Note also in FIG. 4 that the assertion (active high) of the HOLD signal causes the PC Control 34 to hold the updating of PA, and thus also stops the latching in and execution of instructions read from the program memory 12.

Figure 5:
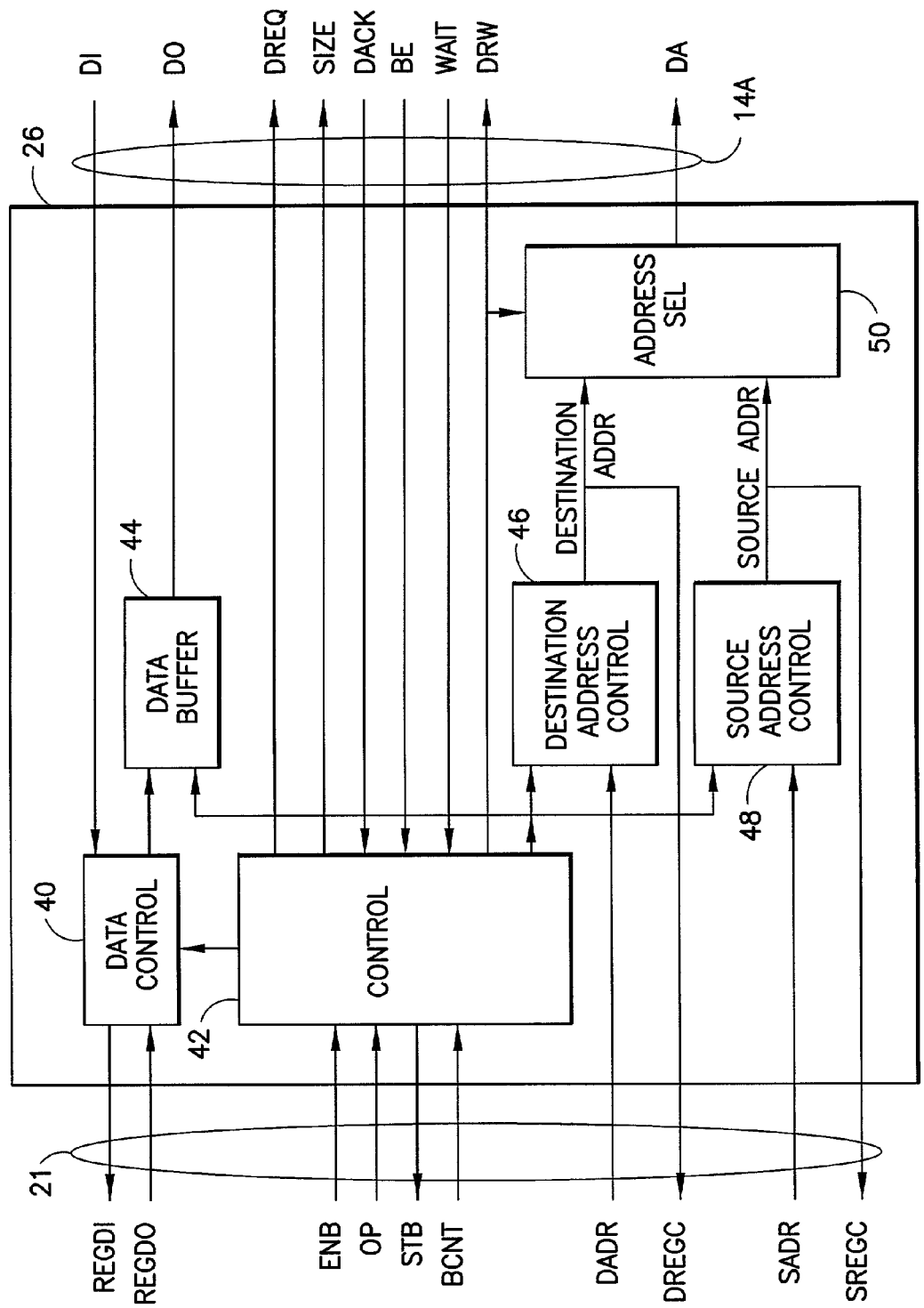
FIG. 5 is a block diagram of the DBUS block shown in FIG. 2.

Referring to FIG. 5, DBUS block 26 handles the data transfer between Registers 22 and Data Memory 14, Data Memory to Data Memory, and Data Memory and the CBUS 16A, according the command from the CPU control block 20. The DBUS block 26 includes a data control block 40, an overall control block 42, an outgoing data buffer 44, a destination address control block 46, a source address control block 48 and an Address Selector block 50.

In the preferred (but not limiting) embodiment DO and DI are each 32-bits in width, and support 8-bit, 16-bit and 32-bit access with generated SIZE, Bus Enable (BE) and WAIT signal lines. Data In (DI) is registered in data control block 40 before being passed to the CPU control block 40, or routed to the Register File 22 or the CBUS block 28. DREQ and DACK are Data Request and Data Acknowledge signal lines, respectively. DREQ is sourced by the Control block 42, and DACK is received from an external source. Data Read/Write (DRW) indicates the direction of data flow in a conventional manner. The Data Address (DA) to the data memory 14 is sourced from the address selection multiplexer, that selects either a destination address generated by block 46 for a memory write operation or a source address generated by block 48 for a memory read operation. Registered versions of the destination and source addresses (DREGC and SREGC, respectively) are also employed internally, such as in the Register File block 22.

The control block 42 controls the DBUS block 26 operation according to ENB and OP from Control 20 (FIG. 2). ENB starts the current operation, and OP specifies the operation type: for example, single Register 22 to/from memory 14 transfer, memory 14 to memory 14 transfer, memory 14 to/from I/F 16 transfer. For multiple transfers, BCNT (Byte Count) specifies the bytes to be transferred. The STB signal is used to inform Control 20 (FIG. 2) that the current operation is completed. For multiple Registers 22 to memory 14 transfer, the register data are buffered in Data Buffer 44 to eliminate the CPU having to wait for the data transfer to complete. For a 32-bit data transfer from an 8-bit or 16-bit memory 14, or a 16-bit data transfer from an 8-bit memory 14, data is assembled in Data Control 40 first before being latched into Register 22. For a multiple memory 14 to memory 14 transfer, data is realigned in the Data Control 40 and Data buffer 44, under the supervision of Control 42, according to SADR, DADR and BCNT. The goal is to use the maximum data width to increase the data transfer speed. For example, if SADR=103, DADR=204 and BCNT=4, the operation is: read 8-bits from address 103, read 32-bits from address 104 and combine these to a 32-bit word and write to address 204. This operation has two reads and one write, as opposed to four reads and four writes.

Figure 6:
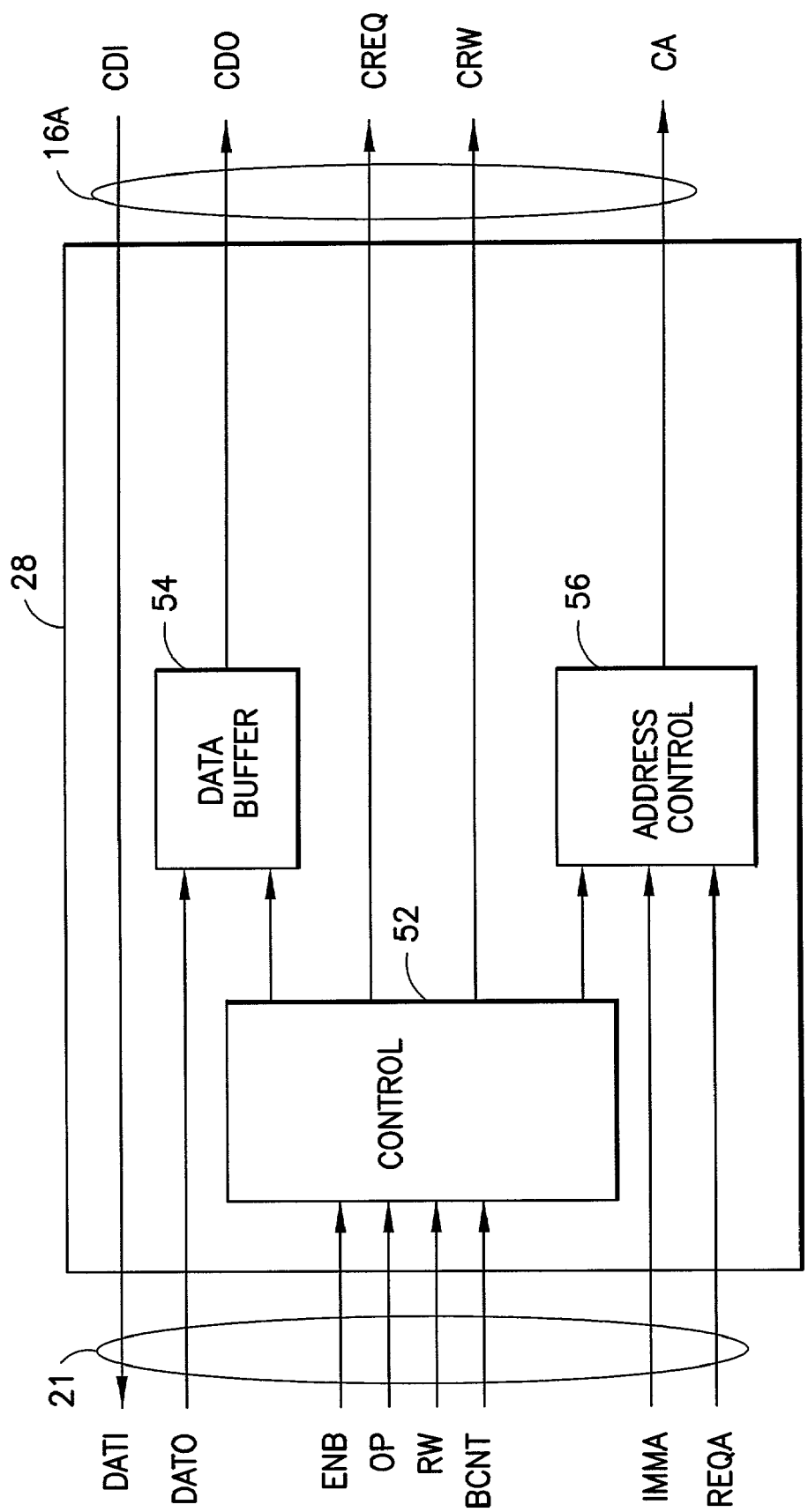
FIG. 6 is a block diagram of the CBUS block shown in FIG. 2.
Figure 7:
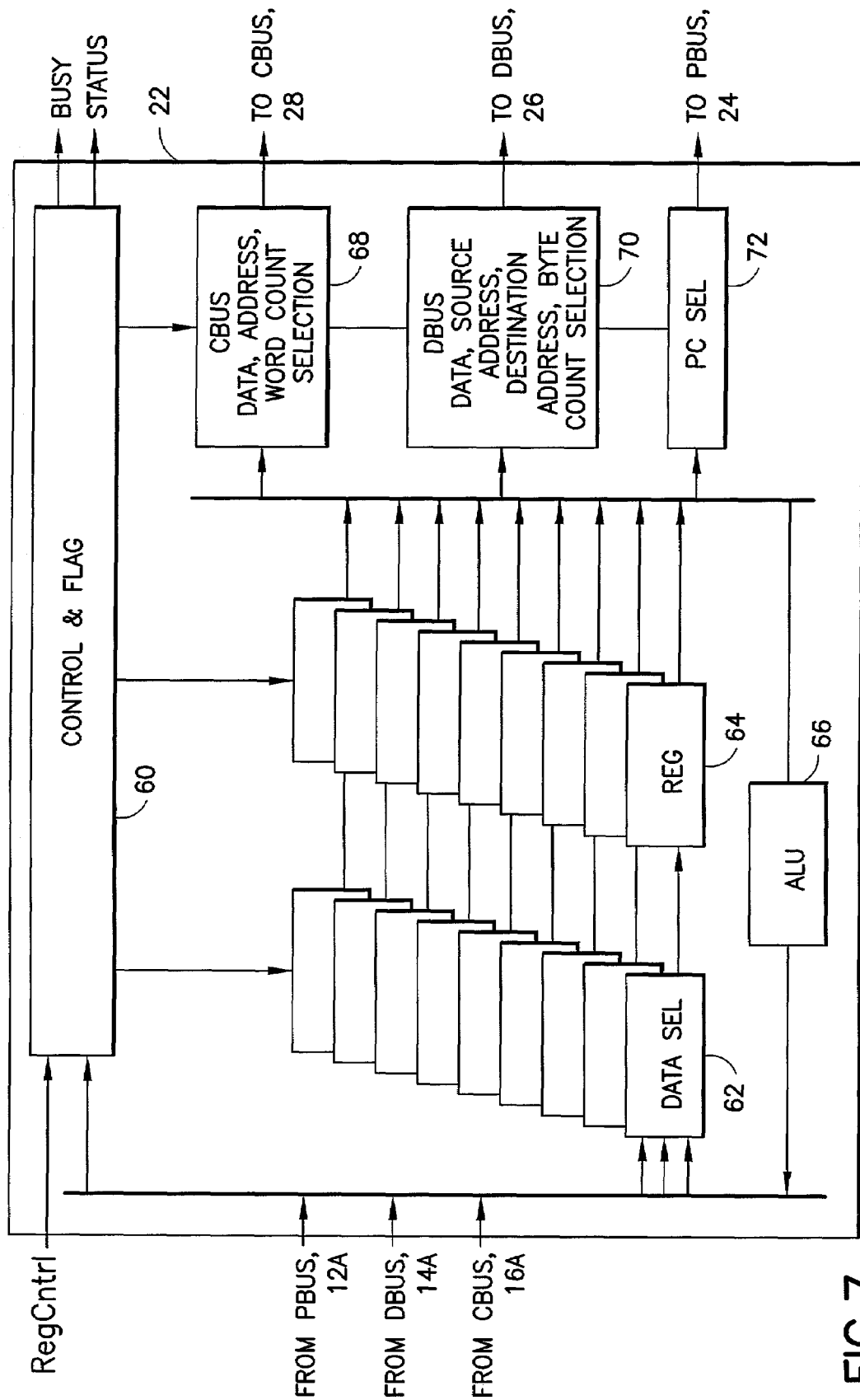
FIG. 7 is a block diagram of the Register File block shown in FIG. 2.

Referring to FIG. 6, the CBUS block 28 is similar to the DBUS block 26 except that only 32-bit access is supported, and all Control Bus accesses are performed in one clock cycle without waiting. The CBUS block 28 includes a control logic block 52, a data buffer 54 and an Address Control block 56, which functions in a manner similar to a multiplexer. The Control address (CA) can originate from a register (REGA) or it may be immediate data that results from instruction decoding (IMMA). All access through CBUS 16A is 32-bits in width. Data may be transferred between the Register File 22 and the CBUS 16A, or between the DBUS 14A and CBUS 16A. There is, at present, no data transfer between CBUS and CBUS. For multi-transfers, the CBUS block 28 only handles transfers between the CBUS 16A and the Registers 22, while the DBUS block 26 handles transfers between the DBUS 14A and the CBUS 16A.

The control logic block 52 controls the operation of the CBUS block 28 in accordance with signals ENB, OP and RW from control logic block 20. ENB initiates a data transfer, OP specifies the operation type: single Register 22 to/from I/F 16 transfer, multiple registers 22 to/from I/F 16, memory 14 to/from I/F 16 transfer, etc. For multiple transfers, BCNT specifies the bytes to be transferred. RW (Read/Write) specifies the transfer direction. For a multiple Registers 22 to I/F 16 transfer, the register data are buffered in Data Buffer 54 to eliminate the CPU having to wait for the data transfer to complete.

The Register File 22 includes a control and flag logic block 60 that determines which register(s) will be updated according to control input from the control logic block 20 and the current status. The Register File 22 also includes a bank of data selectors 62, a bank of 32-bit wide registers 64, an ALU 66, and CBUS block interface logic 68, DBUS block interface logic 70 and PC select logic 72 that is coupled to the PBUS block 24. There are two flag bits for each register 64 in the Register File 22: WBUSY and RBUSY, which are used for control of write to/read from data memory 16. When data is read from data memory into a register 64, the related RBUSY flag is set to prevent use of that register before update. When writing a content of a register 64 into the data memory 16, the related WBUSY flag is set to prevent that register being rewritten before the data transfer is complete. Data transfer between registers 64 can be done directly or through the ALU 66, thereby enabling mathematical and logical operations to be performed on registers, and the result written back into the same or different registers.

Figure 8A:
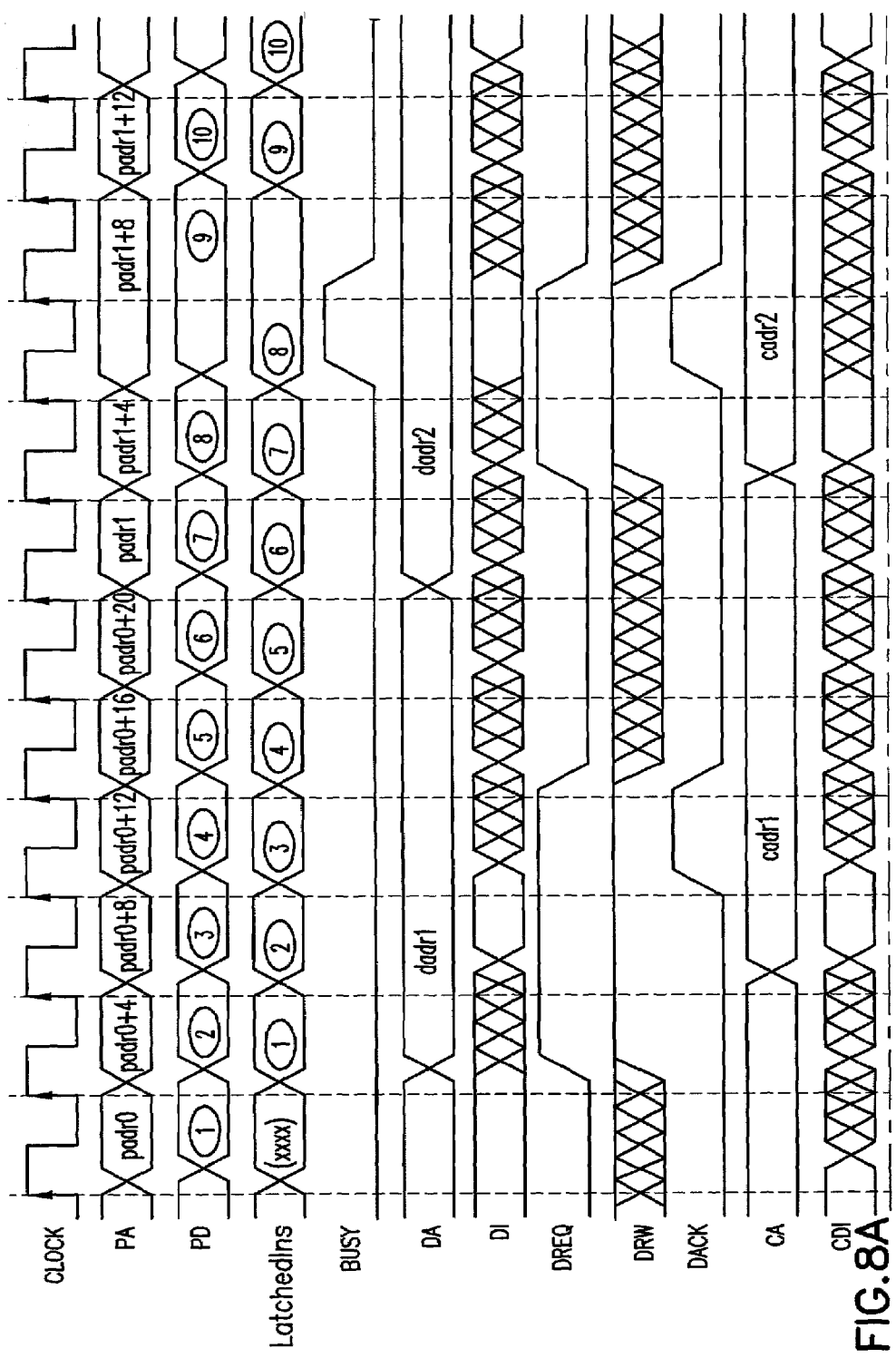

FIG. 8 shows the waveforms of a data transfer between the Register File 22 and the CBUS 16A and DBUS 14A for the following exemplary program. The program thus illustrates how the software structure influences program execution. In the following program padr means physical address, and Rx identifies register x in the bank of registers 64. The use of the Busy signal line is also illustrated in FIG. 8.

```
(1)   padr0       LDD   R0, dadr1      ;load a 32bit from data address dadr1 into R0
(2)   padr0+4           LDC   R1, cadr1      ;load a 32bit from control address cadr1 into R1
(3)   padr0+8           MOV   R5, R2 ;R5=R2
(4)   padr0+12          CMP   R0, R1 ;compare R0 and R1
(5)   padr0+16          BEQ   padr1  ;if equal, jump to padr1
(6)   padr0+20          MOV   R2, #0x40      ;R2=#0x40
      ... ... ...
(7)   padr1       LD    R0R1,cadr2,dadr2      ;R0=control address cadr2, R1= data address dadr2
(8)   padr1+4           CMP   R0, R1 ; compare R0 and R1
(9)   padr1+8
(10)  padr1+12
```

In many applications the program is loaded from some other device, such as FLASH. In order to implement this feature a control circuit can be used to switch the program memory 12 from the PBUS 12A to the Memory Control Unit 15, with the HOLD signal being asserted if the initial program loading is controlled by others, and to switch back to the PBUS 12A after the program loaded (and HOLD is released). If the loading is controlled by the CPU 10 itself, this can be accomplished by switching the program memory 12 between the PBUS 12A and the Memory Control Unit 15.

Figure 9:
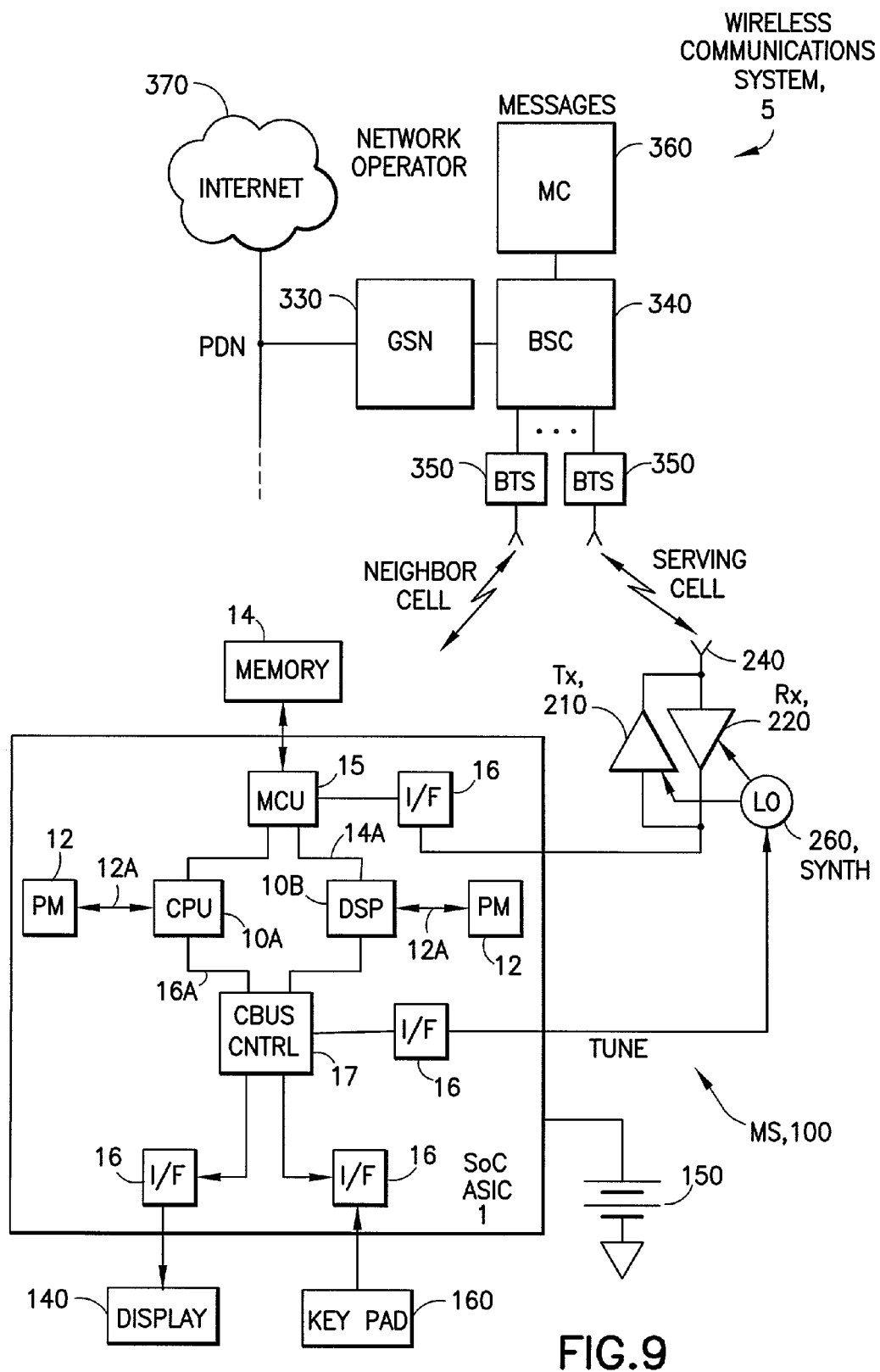
FIG. 9 is a block diagram of an exemplary wireless communication system that includes a battery powered mobile station that is constructed in accordance with these teachings to include the multi-bus structure in a SoC ASIC.

FIG. 9 shows an application of the foregoing teachings in a mobile station (MS) 100 of a wireless communications system 5. The wireless communications system 5 includes at least one MS 100 that is constructed to include the SoC ASIC 1 described with reference to FIGS. 1–8. In the illustrated example the SoC ASIC 100 includes one CPU 10A and one DSP 10B, in addition to the MCU 15, CBUS Controller 17, the I/Fs 16 and, in this embodiment, a program memory 12, one for the CPU 10A and one for the DSP 10B. The data memory 14 is, in the illustrated embodiment, external to the SoC ASIC 1. In other embodiments the data memory 14 could be internal to the SoC ASIC 1. Also as illustrated, the FIFs 16 are used for interfacing to a display 140 and to a keypad 160, as well as to a programmable frequency synthesizer 260 and to the RF transceiver. Other devices and functions can be interfaced to and controlled in a similar fashion.

FIG. 9 also shows an exemplary network operator having, for example, a GPRS Support Node (GSN) 330 for connecting to a telecommunications network, such as a Public Packet Data Network or PDN, at least one base station controller (BSC) 340, and a plurality of base transceiver stations (BTS) 350 that transmit in a forward or downlink direction both physical and logical channels to the mobile station 100 in accordance with a predetermined air interface standard. A reverse or uplink communication path also exists from the mobile station 100 to the network operator, which conveys mobile originated access requests and traffic. The air interface standard can conform to any suitable standard or protocol, and may enable both voice and data traffic, such as data traffic enabling Internet 70 access and web page downloads. The air interface standard could be a Time Division Multiple Access (TDMA) air interface that supports a GSM or an advanced GSM protocol and air interface, or it could be one that supports a CDMA or a wideband CDMA air interface.

The network operator may also include a suitable type of Message Center (MC) 360 that receives and forwards messages for the mobile stations 100. Other types of messaging service may include Supplementary Data Services and one under currently development and known as Multimedia Messaging Service (MMS), wherein image messages, video messages, audio messages, text messages, executables and the like, and combinations thereof, can be transferred between the network and the mobile station 100.

The mobile station 100 may be a handheld radiotelephone, such as a cellular telephone or a personal communicator. The mobile station 100 could also be contained within a card or module that is connected during use to another device. For example, the mobile station 100 could be contained within a PCMCIA or similar type of card or module that is installed during use within a portable data processor, such as a laptop or notebook computer, or even a computer that is wearable by the user.

Although not shown, a microphone and speaker are typically provided for enabling the user to conduct voice calls in a conventional manner. A battery 150 is provided for powering the various circuits of the MS 100.

The mobile station 100 also contains a wireless section that includes the DSP 10B, or an equivalent high speed processor or logic, as well as a wireless transceiver that includes a transmitter 200 and a receiver 220, both of which are coupled to an antenna 240 for communication with the network operator. At least one local oscillator (LO) 260, such as the 15 above-mentioned programmable frequency synthesizer, is provided for tuning the transceiver. Data, such as digitized voice and packet data, is transmitted and received through the antenna 240 under the control of the DSP 10B and the CPU 10A.

It can be appreciated that in this embodiment the SoC integrated circuit package 1 is installed within the mobile station 100, where the first processor core functions as the CPU 10A for controlling the overall operations of the mobile station 100, including the user interface via display 140 and keypad 150, and where the second processor core functions as the DSP 10B for controlling various aspects of the wireless operation of the mobile station 100.

The use of the SoC ASIC 1 provides a number of advantages in the construction and operation of the MS 100, including an ability to increase the MIPs rate while maintaining the current consumption from the battery 150 at a reasonable level. The MIPs rate is increased as a result of the multi-bus architecture, wherein the program memory 12 resides on the program bus 12A, the data memory 14 resides on the data bus 14A, and the control functions, including 30 programmed I/O and other slower speed interface functions, are carried out over the control bus 16A. In this manner the ability to fetch and execute instructions is not impeded by the need to fetch and store data, or by the need to perform control functions, including programmed I/O and other relatively slow speed functions. Thus, the effective MIPs rate can be increased, without requiring an increase in the clock frequency and a corresponding increase in the overall power consumption.

While described in the context of presently preferred embodiments it should be realized that these embodiments are intended to be viewed as examples of these teachings, and are not intended to be viewed as limiting the scope of these teachings. For example, while described above generally in the context of a SoC ASIC, the circuitry could be constructed using any type of integrated circuit technology, including the use of thick film or thin film hybrid circuits wherein individual integrated circuit die are mounted to a common substrate and packaged within a common enclosure. These teachings are also not limited to providing only CPU and DSP types of processor cores, and is also within the scope of these teachings to provide more than one type of CPU and/or DSP within a single SoC.

What is claimed is:

1. A data processor comprising at least two processor cores, each said processor core having a first interface supporting a first bus coupled to an associated one of at least two program memories, a second interface supporting a second bus coupled to a common data memory accessible by each of said at least two processor cores, and a third interface supporting a third bus coupled to at least one input/output device accessible by each of said at least two processor cores, each of said first, second and third buses comprise an address bus that is sourced from one of said processor cores and a data bus, where said at least two processor cores are contained within a single integrated circuit package, and where said integrated circuit package is installed within a mobile station, where a first processor core functions as a CPU for controlling the overall operations of said mobile station, including a user interface, and where a second processor core functions as a DSP for controlling aspects of the wireless operation of said mobile station.

2. A data processor as in claim 1, wherein said first interface supports a unidirectional data bus, and wherein said second interface and said third interface each support a bidirectional data bus.

3. A data processor as in claim 1, wherein each of said at least two processor cores has said second interface coupled to said common data memory through a common memory control unit.

4. A data processor as in claim 1, wherein each of said at least two processor cores has said third interface coupled to at least one of a plurality of interface devices through a common control bus unit.

5. A data processor comprising at least one processor core, said processor core having a first interface supporting a first bus coupled to a program memory, a second interface supporting a second bus coupled to a data memory, and a third interface supporting a third bus coupled to at least one input/output device, each of said first, second and third buses comprise an address bus that is sourced from the processor core and a data bus, wherein said processor core operates with a clock signal, and fetches an instruction from said program memory using said address bus and said data bus of said first interface, the instruction fetch being referenced to a predetermined edge of said clock signal, said processor core beginning an execution of said fetched instruction on a next occurrence of said predetermined edge of said clock signal.

6. A data processor as in claim 5, wherein said first interface is responsive to an assertion of a HOLD signal for suspending the fetching of a next instruction from said program memory.

7. A mobile station comprising an RF transceiver and a user interface, said mobile station further comprising a plurality of data processor cores, each of said data processor cores having a first interface supporting a first bus coupled to an associated one of a plurality of program memories, a second interface supporting a second bus coupled to a common data memory, and a third interface supporting a third bus coupled to at least one input/output device, each of said first, second and third buses comprise an address bus that is sourced from the processor core and a data bus, said plurality of data processor cores being contained within a single integrated circuit package, where a first processor core functions as a CPU for controlling the overall operation of said mobile station, including said user interface, and where a second processor core functions as a DSP for controlling operation of said RF transceiver, wherein each of said processor cores operates with a clock signal and fetches an instruction from said associated one of said plurality of program memories using said address bus and said data bus of said first interface, the instruction fetch being referenced to a predetermined edge of said clock signal, each said processor core beginning an execution of said fetched instruction on a next occurrence of said predetermined edge of said clock signal.

8. A mobile station as in claim 7, wherein said first interface supports a unidirectional data bus, and wherein said second interface and said third interface each support a bidirectional data bus.

9. A mobile station as in claim 7, wherein each of said plurality of processor cores has said second interface coupled to said common data memory through a common memory control unit.

10. A mobile station as in claim 7, wherein each of said plurality of processor cores has said third interface coupled to at least one of a plurality of interface devices through a common control bus unit.

11. A mobile station as in claim 7, wherein said first interface is responsive to an assertion of a HOLD signal for suspending the fetching of a next instruction from said program memory.

12. A method for operating a data processor comprising providing at least one processor core, said processor core having a first interface supporting a program bus coupled to a program memory, a second interface supporting a data bus coupled to a data memory, and a third interface supporting a control bus coupled to at least one interface device, each of said first, second and third buses comprise an address bus that is sourced from the processor core and a data bus, further comprising providing a clock signal and, in synchronism with a predetermined edge of said clock signal, fetching a program instruction from the program memory over a program bus, decoding a fetched instruction, beginning execution of the decoded instruction during a next occurrence of the predetermined edge of said clock signal and, depending on the decoded instruction, at least one of reading data from or writing data to the data memory over the data bus and reading data from or writing data to the interface device over the control bus.

13. A method as in claim 12, wherein each of said program, data and control buses comprise a data bus and an address bus that is sourced from said data processor.

14. A method as in claim 12, wherein said program bus supports a unidirectional data bus.

15. A method as in claim 12, and responsive to an assertion of a HOLD signal, suspending the fetching of a next instruction from said program memory.

* * * * *